United States Patent
Bedoukian

[15] 3,652,291
[45] Mar. 28, 1972

[54] CITRUS OIL AND OTHER OILS HAVING ENHANCED SPECIFIC GRAVITY, AND USE THEREOF

[72] Inventor: Paul Z. Bedoukian, 40 Ashley Road, Hastings-on-Hudson, N.Y. 10706

[22] Filed: Oct. 16, 1970

[21] Appl. No.: 81,505

Related U.S. Application Data

[63] Continuation-in-part of Ser. No. 36,439, May 11, 1970.

[52] U.S. Cl. ..................................99/28, 99/78, 99/118 R, 99/140 R, 252/312
[51] Int. Cl. ..........................................A23l 1/26, A23d 5/00
[58] Field of Search........................99/28, 78, 118 R, 140 R; 252/306, 308, 311, 352, 312, 356; 260/476 R

[56] References Cited

UNITED STATES PATENTS

| | | |
|---|---|---|
| 1,914,902 | 6/1933 | Volck ................................252/312 X |
| 2,893,869 | 7/1959 | Beck et al. ...................................99/28 |
| 3,187,019 | 6/1965 | Jeffries...................................99/28 X |
| 3,353,961 | 11/1967 | Simon.........................................99/78 |

*Primary Examiner*—Morris O. Wolk
*Assistant Examiner*—Stephen B. Davis
*Attorney*—Bryan, Parmelee, Johnson & & Bollinger

[57] ABSTRACT

Polyol benzoate such as glyceryl tribenzoate or propylene glycol dibenzoate or a mixture of the two is combined with an edible oil such as citrus oil or coconut oil to form a mixture having an enhanced specific gravity. The mixture is emulsified by the addition of an aqueous solution of gum arabic. The emulsion is mixed with a beverage base of approximately the same specific gravity.

22 Claims, No Drawings

CITRUS OIL AND OTHER OILS HAVING ENHANCED SPECIFIC GRAVITY, AND USE THEREOF

This application is a continuation-in-part of Ser. No. 36,439, filed May 11, 1970.

BACKGROUND OF THE INVENTION

In the past citrus-flavored soft drinks have been made from citrus oils, by adding agents such as brominated vegetable oils to the citrus oil until the specific gravity of the mixture of citrus oil and additive was about 1.03, emulsifying the mixture by various emulsifying agents, such as gum arabic, to obtain a small particle-size emulsion, and mixing the emulsion with sugar solution, a food acid, and coloring, to give a beverage. Emulsified coconut oil has also been added to soft drinks as a clouding agent thereof. It, too, has required additives to adjust specific gravity.

The purpose of using an oil mixture of specific gravity 1.03 was to provide particles of emulsified oil with about the same density as the remainder of the soft drink. This allowed the mixture to be emulsified and not to separate either at the top of the soft drink or at the bottom. It also gave the desired cloudy effect. In beverages made from citrus oil alone, the citrus oil would rise to the neck of the bottle, i.e. "cream out", because the specific gravity of citrus oil is about 0.86 and, as such, it is much lighter than the sugar solution, or other sweetened base, of the soft drink.

DETAILED DESCRIPTION OF THE INVENTION

My proposal is to use polyol benzoates mixed with the citrus oil, as specific gravity-enhancing agents. The polyol benzoates used must have a density sufficiently greater than that of the beverage base so that, when used in reasonable quantities, they can increase the density of the citrus oil mixture sufficiently. They must also be relatively odorless and tasteless; nontoxic; sufficiently soluble in citrus oils, but not in water; and when emulsified with the citrus oils, give a stable emulsion. The emulsion will remain dispersed throughout the beverage giving the desired cloudiness.

Two such polyol benzoates that I have found acceptable and preferable are glyceryl tribenzoate (1, 2, 3-propanetriol tribenzoate), also called tribenzoin, and propylene glycol dibenzoate (1, 2-propanediol dibenzoate).

Glyceryl tribenzoate has the formula $C_3H_5(OOCC_6H_5)_3$, a molecular weight of 404, a melting point of 76° C and a specific gravity of slightly over 1.2. Propylene glycol dibenzoate has the formula $C_3H_6(OOCC_6H_5)_2$, a molecular weight of 284, a boiling point of 200° C. at 2mm. mercury pressure and a specific gravity of about 1.14.

While glyceryl tribenzoate and propylene glycol dibenzoate are preferred, other polyol benzoates such as tri-ethylene glycol dibenzoate and neo-pentyl glycol dibenzoate have worked successfully to enhance the citrus oil specific gravity and provide a stable emulsion. Tri-ethylene glycol dibenzoate has the formula $C_6H_{10}(OH)_2(OOCC_6H_5)_2$, a molecular weight of 358, a specific gravity of 1.27 and a melting point of 47° C. Neo-pentyl glycol dibenzoate has the formula $C_3H_4(CH_3)_2(OOCC_6c5)_2$, a molecular weight of 312, a specific gravity of 1.22 and a melting point of 49° C.

The preferred polyol benzoates can be manufactured by esterifying the polyol, i.e., the polyhydric alcohol, with benzoic acid in the presence of suitable catalysts in a known manner. I have made both by heating the respective polyol with an excess of benzoic acid in the presence of a catalyst such as para-toluene-sulfonic acid. Toluene is used as a solvent and to remove the water formed during the process of esterification. The reaction product is washed with an alkali solution to remove the catalyst and excess benzoic acid, then purified, in the case of glyceryl tribenzoate by crystallizing from a suitable medium such as toluene or methanol and in the case of propylene glycol dibenzoate by distillation.

The citrus oil used in my composition may be any of the standard commercial oils used in beverages and can include orange, grapefruit, lime or lemon. Generally these oils have a specific gravity ranging from 0.86 to 0.89. Also used in my invention are other oils such as coconut oil, the emulsions of which are used as clouding agents for beverages. Coconut oil has a specific gravity of about 0.94.

The polyol benzoates can be advantageously added alone or in combination to the citrus oil alone or to citrus oil having added thereto other suitable agents commonly used in the flavoring industry, such as brominated vegetable oil or any other compound acceptable for increasing the specific gravity of the citrus oil mixture.

To prepare the citrus oil mixture, the citrus oil (or citrus oil with other additives) and the polyol benzoate or a mixture of polyol benzoates are mixed at a temperature over 60° C. and stirred until the polyol benzoate is dissolved in the citrus oil. Preferably, the proportions are such that the resulting mixture has a specific gravity of about 1.03; but the exact proportions will vary, however, depending upon the citrus oil used. The mixture should have a specific gravity approximating that of the beverage base. By the term "beverage base", I means to include not only sugar solutions but also those agents commonly added thereto, such as flavor, acid, coloring etc., to make a commercial soft drink.

When using glyceryl tribenzoate and citrus oil, about three parts of citrus oil to about four parts of glyceryl tribenzoate, by weight, will give the desired specific gravity; but the exact proportions will vary, however, depending upon the citrus oil used and the specific gravity of the beverage base. Propylene glycol dibenzoate and citrus oil in a weight ratio of approximately two to one have yielded the proper specific gravity. Similarly, two parts of tri-ethylene glycol dibenzoate to approximately one part of citrus oil, by weight, usually gives a satisfactory specific gravity.

Since the specific gravity of beverage bases may vary from about 1.025 to about 1.035, the mixture of polyol benzoate with citrus oil should be varied in proportions to produce a predetermined desired specific gravity range corresponding to that of the sugar solution or other beverage base used. If dietetic drinks are made with artificial sweeteners or small amounts of sugar, the specific gravity of the beverage base may be as low as 1.0, and so a lower proportion of polyol benzoate should be used in the mix to approximate that of the beverage base.

The citrus oil and polyol benzoate mixture is emulsified, when warm, by the addition of a 10 to 20 percent water solution of gum arabic as an emulsifier. The ratio of gum arabic to citrus oil should be about 1:1 by weight, but can be varied to about 1:3. Since the water in the gum arabic solution is not miscible with the citrus oil and glyceryl tribenzoate, its presence does not affect the specific gravity of the emulsified oil. Preferably, emulsification is carried out until particle sizes are 1 to 2 microns; this will give best opacity in the finished drink.

To make a soft drink, this emulsion is added to sugar syrup, normally about 32°Baume, suitable acidulated. It may be added in any desired ratio, as with prior emulsions, but generally about one to three fluid ounces of emulsion is added to a gallon of sugar syrup. Coloring may be added. One ounce of the resulting mixture is added to five ounces of carbonated water to give a carbonated beverage. Mixing techniques are the same as with prior art brominated vegetable oils.

The sugar syrup has a specific gravity of about 1.26 to 1.3. When diluted to a sugar solution, as above, the beverage normally has a specific gravity of 1.03, with a range, depending upon flavor, of 1.025 to 1.035. The range may be as great as from about 1.02 to about 1.05. Since the sugar solution and the emulsion have substantially the same specific gravities, stability is thus imparted to the resulting beverage.

An improved shelf life is obtained by using a mixture of glyceryl tribenzoate and propylene glycol dibenzoate. One may use a mixture of the two benzoates in any proportions, but preferably 40–70 weight per cent of propylene glycol dibenzoate is used. Depending upon the specific needs of the emulsion prepared, one can use such a mixture along with other agents commonly used to enhance specific gravity.

One can use a wide variety of formulations for citrus oil mixtures, but for the purposes of illustrating my invention, I give the following:

|  | Parts by Weight |
|---|---|
| 1. Glyceryl tribenzoate | 10.5 |
| Propylene glycol dibenzoate | 10.5 |
| Citrus oil | 12 |
| 2. Glyceryl tribenzoate | 10 |
| Propylene glycol dibenzoate | 15 |
| Citrus oil | 14.5 |
| 3. Glyceryl tribenzoate | 5 |
| Propylene glycol dibenzoate | 15 |
| Citrus oil | 11 |
| 4. Glyceryl tribenzoate | 18 |
| Propylene glycol dibenzoate | 12 |
| Citrus oil | 19 |
| 5. Glyceryl tribenzoate | 11 |
| Propylene glycol dibenzoate | 12 |
| Brominated vegetable oil | 5 |
| Citrus oil | 18 |

The above quantities were mixed and warmed when necessary to get a uniform solution. The specific gravity was then checked and, if necessary, adjusted to 1.025 by slightly varying the proportions, the 1.025 being suitable for obtaining an emulsion for citrus beverages.

The emulsion itself was made by adding one part of any of the above mixtures to nine parts of an aqueous solution of 10–20 per cent gum arabic. The mixture was then passed through a homogenizer to get an emulsion of particle size in the order of, preferably, two microns. About two ounces of such an emulsion is added to a gallon of acidulated and colored syrup of about 32° Baume. The syrup is converted to a beverage by mixing it with five parts of carbonated water. The exact proportion of flavor, sugar, acid, color, etc., varies somewhat with the type of beverage prepared.

As discussed above, one may use coconut oil with the polyol benzoates, in a similar manner, to produce an emulsion useful as a clouding agent. Approximate mixtures include:

|  | Parts by Weight |
|---|---|
| 1. Glyceryl tribenzoate | 10 |
| Propylene glycol dibenzoate | 10 |
| Coconut oil | 30 |
| 2. Propylene glycol dibenzoate | 11 |
| Coconut oil | 10 |
| 3. Glyceryl tribenzoate | 5 |
| Propylene glycol dibenzoate | 10 |
| Coconut oil | 20 |

These proportions may be varied, as required, so as to adjust the specific gravity to that of the beverage base used.

Alternatively, tri-ethylene glycol dibenzoate, neo-pentyl glycol dibenzoate, or mixtures of the named polyol benzoates may be used, with or without other commonly used specific gravity-enhancing agents. Proportions must, of course, be adjusted to give the desired specific gravity.

When using polyol benzoates with coconut oil, mixture with the oil, emulsification, and manufacture of the beverage is done in a manner similar to that for citrus oils.

What is claimed is:

1. An oil mixture in which the oil has an enhanced specific gravity, for mixing with a beverage base such as a sugar solution to make a beverage, said beverage base having a higher specific gravity than the oil used in said mixture, said mixture comprising said oil and polyol benzoate, said polyol benzoate being soluble in said oil, but insoluble in water, non-toxic and having a specific gravity greater than said beverage base, said polyol benzoate being dissolved in said oil, the proportions of said oil to polyol benzoate being such that said mixture has a specific gravity approximating that of said beverage base.

2. An oil mixture as set forth in claim 1 in which said oil is citrus oil, said beverage base is sugar solution, and the specific gravity of said mixture is between about 1.025 and about 1.035.

3. An oil mixture as set forth in claim 1 in which said polyol benzoate is glyceryl tribenzoate.

4. An oil mixture as set forth in claim 1 in which said polyol benzoate is propylene glycol dibenzoate.

5. An oil mixture as set forth in claim 1 in which said polyol benzoate is tri-ethylene glycol dibenzoate.

6. An oil mixture as set forth in claim 1 in which said polyol benzoate is neo-pentyl glycol dibenzoate.

7. An oil mixture as set forth in claim 1 in which said polyol benzoate is a mixture of glyceryl tribenzoate and propylene glycol dibenzoate.

8. An oil mixture as set forth in claim 7 in which said oil is citrus oil.

9. An oil mixture as set forth in claim 7 in which said oil is coconut oil.

10. An emulsion for use in beverage manufacture comprising a mixture of citrus oil and polyol benzoate, said polyol benzoate being glyceryl tribenzoate, propylene glycol dibenzoate, or a mixture of the two, and an emulsifier, the proportion of citrus oil to polyol benzoate being such that the specific gravity of said mixture is between about 1.025 and about 1.035.

11. The emulsion of claim 10 in which the specific gravity of said mixture is about 1.03.

12. The emulsion of claim 10 in which the emulsifier is an aqueous solution of gum arabic.

13. A modified citrus oil enhanced by the addition of a polyol benzoate, said polyol benzoate being glyceryl tribenzoate, propylene glycol dibenzoate, or a mixture of the two, emulsified therewith to provide a characteristic such that said modified, enhanced citrus oil may be mixed with a beverage base to form a stable beverage, said modified, enhanced citrus oil being characterized by having a specific gravity of approximately that of said beverage base.

14. The modified, enhanced citrus oil of claim 13 in which the beverage base is sugar solution and said specific gravity is about 1.03.

15. A citrus flavored beverage comprising a sweetened water base and an aqueous emulsion of citrus oil and a polyol benzoate, said polyol benzoate being glyceryl tribenzoate, propylene glycol dibenzoate, or a mixture of the two, and said citrus oil and said polyol benzoate being in such proportions that said emulsion has a specific gravity approximating that of said sweetened base.

16. A beverage as set forth in claim 15 in which said sweetened base is sugar solution and the specific gravities of said sugar solution and of said emulsion are approximately the same and are between about 1.02 and about 1.05.

17. In a citrus-flavored beverage including a sweetened water base and an aqueous citrus oil emulsion having a specific gravity substantially the same as that of said sweetened water base, and said citrus oil emulsion includes citrus oil, an emulsifier, and an additive to balance the specific gravity of said emulsion as aforesaid, that improvement in which said additive is polyol benzoate which is soluble in said citrus oil, but insoluble in water, is nontoxic, and has a specific gravity greater than that of said water base, said polyol benzoate being used in such proportion to said citrus oil so as to give the polyol benzoate-citrus oil mixture a specific gravity substantially the same as that of said sweetened water base.

18. An additive as set forth in claim 17 in which said polyol benzoate is glyceryl tribenzoate.

19. An additive as set forth in claim 17 in which said polyol benzoate is propylene glycol dibenzoate.

20. An additive as set forth in claim 17 in which said polyol benzoate is tri-ethylene glycol dibenzoate.

21. An additive as set forth in claim 17 in which said polyol benzoate is neo-pentyl glycol dibenzoate.

22. An additive as set forth in claim 17 in which said polyol benzoate is a mixture of glyceryl tribenzoate and propylene glycol dibenzoate.

* * * * *

UNITED STATES PATENT OFFICE
CERTIFICATE OF CORRECTION

Patent No. 3,652,291      Dated March 28, 1972

Inventor(s) Paul Z. Bedoukian

It is certified that error appears in the above-identified patent and that said Letters Patent are hereby corrected as shown below:

Column 1, line 60, that portion of the formula reading " $(OOCC_6c5)_2$ " should read -- $(OOCC_6H_5)_2$ --.

Column 2, line 21, "means" should read -- mean --.

Signed and sealed this 1st day of August 1972.

(SEAL)
Attest:

EDWARD M. FLETCHER, JR.      ROBERT GOTTSCHALK
Attesting Officer      Commissioner of Patents